(12) United States Patent
Okamoto et al.

(10) Patent No.: US 8,206,811 B2
(45) Date of Patent: Jun. 26, 2012

(54) THERMOSETTING COMPOSITION

(75) Inventors: Yuki Okamoto, Chiba (JP); Yuuki Kimura, Chiba (JP); Tomohiro Etou, Chiba (JP)

(73) Assignee: JNC Corporation, Tokyo (JP)

( * ) Notice: Subject to any disclaimer, the term of this patent is extended or adjusted under 35 U.S.C. 154(b) by 9 days.

(21) Appl. No.: 12/893,218

(22) Filed: Sep. 29, 2010

(65) Prior Publication Data

US 2011/0091693 A1    Apr. 21, 2011

(30) Foreign Application Priority Data

Oct. 15, 2009   (JP) .................. 2009-238041

(51) Int. Cl.
  *C08F 283/12*   (2006.01)
  *B32B 1/00*   (2006.01)
(52) U.S. Cl. ........................ 428/174; 525/477
(58) Field of Classification Search ........................ None
  See application file for complete search history.

(56) References Cited

U.S. PATENT DOCUMENTS

| | | | | |
|---|---|---|---|---|
| 3,367,910 A | * | 2/1968 | Newing, Jr. ..................... | 528/19 |
| 3,389,114 A | * | 6/1968 | Burzynski et al. ............ | 523/309 |
| 4,190,699 A | * | 2/1980 | Kanazawa et al. ............ | 428/412 |
| 4,224,211 A | * | 9/1980 | Kanazawa et al. ............ | 524/300 |
| 4,238,590 A | * | 12/1980 | Scholze et al. ..................... | 528/5 |
| 4,754,012 A | * | 6/1988 | Yoldas et al. .................... | 528/10 |
| 5,272,240 A | * | 12/1993 | Haruvy et al. .................. | 528/10 |
| 2009/0105395 A1 | * | 4/2009 | Kamata et al. ................ | 524/502 |

FOREIGN PATENT DOCUMENTS

| | | |
|---|---|---|
| JP | 06-346025 | 12/1994 |
| JP | 2000-303023 | 10/2000 |
| JP | 2001-115026 | 4/2001 |
| JP | 2003-031569 | 1/2003 |

* cited by examiner

*Primary Examiner* — Robert S Loewe
(74) *Attorney, Agent, or Firm* — J.C. Patents

(57) ABSTRACT

A material of cured film, a thermosetting film and a display device are provided. The thermosetting composition includes a solvent and at least one siloxane polymer selected from the group consisting of siloxane polymer (A) obtained by hydrolyzing or condensing a silane mixture containing a monofunctional silane represented by formula (1) and a trifunctional silane represented by formula (2), and siloxane polymer (B) obtained by hydrolyzing or condensing a silane mixture containing a bifunctional silane represented by formula (3) and a tetrafunctional silane represented by formula (4).

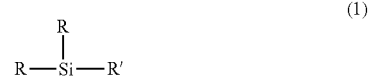

(1)

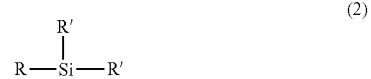

(2)

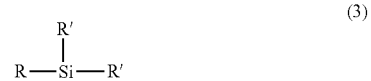

(3)

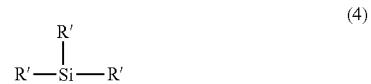

(4)

R independently represents hydrogen, an alkyl group having 1 to 10 carbons whose arbitrary hydrogen can be replaced by a halogen, an aryl group having 6 to 10 carbons whose arbitrary hydrogen can be replaced by a halogen, or an alkenyl group having 2 to 10 carbons whose arbitrary hydrogen can be replaced by a halogen. R' independently represents a hydrolyzable group.

9 Claims, No Drawings

THERMOSETTING COMPOSITION

CROSS-REFERENCE TO RELATED APPLICATION

This application claims the priority benefit of Japan patent application serial no. 2009-238041, filed Oct. 15, 2009. The entirety of the above-mentioned patent applications is hereby incorporated by reference herein and made a part of specification.

BACKGROUND OF THE INVENTION

1. Field of the Invention

The invention relates to a thermosetting composition which can be adopted in cured films such as passivation films.

2. Description of Related Art

In the fabrication of devices such as a liquid crystal display device, when the surface of the display device is processed by chemical agents such as organic solvents, acids, and basic solutions, or a wiring electrode is formed by film formation through sputtering, the display device is partially heated to a high temperature. In order to prevent deterioration, impairment, and degradation on surfaces of various devices, passivation films have been disposed on the surfaces. The passivation film requires characteristics for tolerating various processes performed in the fabrication aforementioned. Specifically, the passivation film requires chemical resistance such as heat resistance, solvent resistance, acid resistance, and alkali resistance, water resistance, sealability to substrates such as glass substrates, transparency, abrasion resistance, coatability, flatness, and light resistance for not resulting in degradation such as coloration in the long term. Known materials configured to fabricate the cured film with these characteristics include a siloxane material (i.e. refer to patent documents 1-4).

On the other hand, materials with superior transparency, heat resistance, chemical resistance and so on are also required in the fabrication of color filter or thin film transistor (TFT). Recently, these fabrications require a fabrication temperature higher than 200° C. Thus, materials with higher heat resistance are demanded.

In addition, materials thicker than 10 μm (thick films) also need to have high transmittance. Researches have been performed to materials capable of being implemented in thick films (i.e. refer to patent document 1). However, the thickness of the film reaches its limited around several μm. That is, the materials introduced previously cannot be further used in thick films.

When the material with the thickness larger than 10 μm undergoes high temperature calcination, the material cracks during the calcination and the transmittance is reduced. The conventional materials fail to satisfy the characteristics such as transparency and heat resistance required by thick films.

[Patent document 1] Japan Patent No. H06-346025.
[Patent document 2] Japan Patent Application No. 2000-303023.
[Patent document 3] Japan Patent Application No. 2001-115026.
[Patent document 4] Japan Patent Application No. 2003-031569.

SUMMARY OF THE INVENTION

The invention is directed to a material having high transparency, superior chemical and heat resistance, and capable of forming a cured film with a thickness of 10 μm to 20 μm through coating without generating cracks, a cured film adopting this material, and a display device.

Inventors performed various researches and come to the conclusion that a composition of a polymer containing a certain siloxane monomer or a composition of two different polymers containing a certain siloxane monomer can solve the above issue, and therefore completed the invention.

The invention includes the following.

[1] A thermosetting composition including a solvent and at least one siloxane polymer selected from a group consisting of a siloxane polymer (A) and a siloxane polymer (B), wherein the siloxane polymer (A) is obtained by hydrolyzing or condensing a silane mixture containing a monofunctional silane represented by formula (1) and a trifunctional silane represented by formula (2), and the siloxane polymer (B) is obtained by hydrolyzing or condensing a silane mixture containing a bifunctional silane represented by formula (3) and a tetrafunctional silane represented by formula (4):

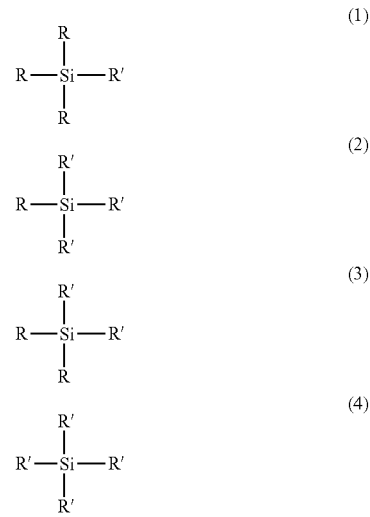

in formulae (1) to (4), R independently represents hydrogen, an alkyl group having 1 to 10 carbons whose arbitrary hydrogen can be replaced by a halogen, an aryl group having 6 to 10 carbons whose arbitrary hydrogen can be replaced by a halogen, or an alkenyl group having 2 to 10 carbons whose arbitrary hydrogen can be replaced by a halogen, and R' independently represents a hydrolyzable group. [2] The thermosetting composition including the siloxane polymer (A), the siloxane polymer (B), and the solvent as described in [1], where in formulae (1) to (4), R independently represents hydrogen, an alkyl group having 1 to 5 carbons whose arbitrary hydrogen can be replaced by a halogen, an aryl group having 6 to 10 carbons whose arbitrary hydrogen can be replaced by a halogen, or an alkenyl group having 2 to 10 carbons whose arbitrary hydrogen can be replaced by a halogen, and R' independently represents an alkoxyl group, a halogen, or an acetoxyl group.

[3] The thermosetting composition as described in [1] or [2], where the monofunctional silane represented by formula (1) is one or more monofunctional silanes selected from a group consisting of trimethylmethoxysilane and trimethylethoxysilane.

[4] The thermosetting composition as described in any one of [1] to [3], where the trifunctional silane represented by formula (2) is one or more trifunctional silanes selected from a group consisting of trimethoxymethylsilane, trimethoxyphenylsilane, triethoxymethylsilane, and triethoxyphenylsilane.

[5] The thermosetting composition as described in any one of [1] to [4], where the bifunctional silane represented by formula (3) is one or more bifunctional silanes selected from a group consisting of dimethyldimethoxysilane, diphenyldimethoxysilane, methylphenyldimethoxysilane, dimethyldiethoxysilane, diphenyldiethoxysilane, and methylphenyldiethoxysilane.

[6] The thermosetting composition as described in any one of [1] to [5], where the tetrafunctional silane represented by formula (4) is one or more tetrafunctional silanes selected from a group consisting of tetramethoxysilane and tetraethoxysilane.

[7] The thermosetting composition as described in any one of [1] to [6], where the monofunctional silane represented by formula (1) is trimethylethoxysilane, the trifunctional silane represented by formula (2) is trimethoxymethylsilane or triethoxyphenylsilane, the bifunctional silane represented by formula (3) is dimethyldiethoxysilane or methylphenyldimethoxysilane, the tetrafunctional silane represented by formula (4) is tetraethoxysilane.

[8] A cured film having crack resistance and a thickness of 10 micrometer ($\mu m$) to 200 $\mu m$, formed by a thermosetting composition as described in any one of [1 to [7], and obtained by curing under a temperature higher than 200° C. ||9] A display device having a cured film as described in [8].

[Results of Invention]

The thermosetting composition of the invention is capable of obtaining a cured film with high transparency and superior chemical and heat resistance. As the cured film obtained from the thermosetting composition of the invention is formed as a thick film (with a film thickness of 10 $\mu m$ to 200 $\mu m$), no cracks are generated. In addition, the cured film above-mentioned and the display device having the cured film are provided according to the invention.

In order to make the aforementioned and other features and advantages of the invention more comprehensible, several embodiments accompanied with figures are described in detail below.

DESCRIPTION OF EMBODIMENTS

1. Thermosetting Composition of the Invention

A thermosetting composition of the invention contains a solvent and at least one siloxane polymer selected from the group consisting of a siloxane polymer (A) and a siloxane polymer (B). The siloxane polymer (A) and the siloxane polymer (B) can be used independently or as a mixture. That is, the thermosetting composition of the invention is a composition merely containing the siloxane polymer (A), a composition merely containing the siloxane polymer (B), or a composition containing both of the siloxane polymer (A) and the siloxane polymer (B). The siloxane polymer (A) and the siloxane polymer (B) respectively can also be one or more than two kinds.

Moreover, the thermosetting composition of the invention further contains components other than the siloxane polymer (A), the siloxane polymer (B), and the solvent within the scope of the invention.

In the thermosetting composition of the invention, the composition containing the siloxane polymer (A) and the siloxane polymer (B) does not result in cissing or mura during a coating process. Thus, a uniform film is obtained preferably.

In a cured film having a thickness larger than 10 $\mu m$ through one coating, contents of the siloxane polymer (A) and the siloxane polymer (B) in the thermosetting composition of the invention have a total content of 20 wt % to 80 wt % preferably, 30 wt % to 80 wt % more preferably, and 40 wt % to 80 wt % most preferably relative to a total content of the thermosetting composition.

After the siloxane polymer (A) and the siloxane polymer (B) are mixed for use, based on chemical agent resistance and sealability to a substrate, the siloxane polymer (A) and the siloxane polymer (B) have a mixing ratio of 50 wt % to 80 wt % preferably, 50 wt % to 70 wt % more preferably, and 50 wt % to 60 wt % most preferably relative to the total content of the siloxane polymer (A) and the siloxane polymer (B).

1-1 Siloxane Polymer (A)

The siloxane polymer (A) is obtained by hydrolyzing or condensing a silane mixture containing a monofunctional silane represented by formula (1) and a trifunctional silane represented by formula (2). Based on crack resistance, in a preferable mixing ratio (molar ratio) of the monofunctional silane represented by formula (1) and the trifunctional silane represented by formula (2), the trifunctional silane represented by formula (2) is preferably 1 mole (mol) to 20 mol, more preferably 1 mol to 10 mol, and most preferably 1 mol to 5 mol relative to 1 mol of the monofunctional silane represented by formula (1).

1-2 Monofunctional Silane Represented by Formula (1)

The monofunctional silane represented by formula (1) is, for example, listed below: trimethylmethoxysilane or trimethylethoxysilane. These monofunctional silanes are preferable in controlling a molecular weight of the thermosetting composition obtained.

1-3 Trifunctional Silane Represented by Formula (2)

The trifunctional silane represented by formula (2) is listed, for example, in the following: trimethoxymethylsilane, trimethoxyphenylsilane, triethoxymethylsilane, and triethoxyphenylsilane. These trifunctional silanes are preferable in enhancing a film density of a cured film formed by the thermosetting composition obtained.

Here, based on crack resistance, the trifunctional silane is preferably obtained by mixing a compound adopting R as an alkyl group and a compound adopting R as an aryl group. In a mixing ratio (molar ratio) of the compound adopting R as the alkyl group and the compound adopting R as the aryl group, the compound adopting R as the aryl group is preferably 0.1 mol to 10 mol, more preferably 0.2 mol to 5 mol, and most preferably 0.3 mol to 3 mol relative to 1 mol of the compound adopting the alkyl group.

1-4 Siloxane Polymer (B)

The siloxane polymer (B) is obtained by hydrolyzing or condensing a silane mixture containing a bifunctional silane represented by formula (3) and a tetrafunctional silane represented by formula (4). Based on crack resistance, in a preferable mixing ratio (molar ratio) of the bifunctional silane represented by formula (3) and the tetrafunctional silane represented by formula (4), the tetrafunctional silane represented by formula (4) is preferably 0.1 mol to 10 mol, more preferably 0.2 mol to 5 mol, and most preferably 0.3 mol to 3 mol relative to 1 mol of the bifunctional silane represented by formula (3).

1-5 Bifunctional Silane Represented by Formula (3)

The bifunctional silane represented by formula (3) is listed, for example, in the following: dimethyldimethoxysilane, diphenyldimethoxysilane, methylphenyldimethoxysilane, dimethyldiethoxysilane, diphenyldiethoxysilane, and methylphenyldiethoxysilane. These bifunctional silanes are preferably in enhancing crack resistance in a cured film formed by the thermosetting composition obtained.

1-6 Tetrafunctional Silane Represented by Formula (4)

The tetrafunctional silane represented by formula (4) is listed, for example, in the following: tetramethoxysilane and tetraethoxysilane. These tetrafunctional silanes are preferable in enhancing a film density of a cured film formed by the thermosetting composition obtained.

1-7 Other Silane Compounds

A silane compound adopting the siloxane polymer (A) and the siloxane polymer (B) as raw materials can also contain other silanes without departing from the scope of the invention.

In a silane mixture using the siloxane polymer (A) as a raw material, conventional silane compounds can also be adopted other than the monofunctional silane represented by formula (1) and the trifunctional silane represented by formula (2). However, this silane mixture does not include the bifunctional silane represented by formula (3) and the tetrafunctional silane represented by formula (4).

In a silane mixture using the siloxane polymer (B) as a raw material, conventional silane compounds can also be adopted other than the bifunctional silane represented by formula (3) and the tetrafunctional silane represented by formula (4). However, this silane mixture does not include the monofunctional silane represented by formula (1) and the trifunctional silane represented by formula (2).

1-8 Fabrication of the Siloxane Polymer (A) and the Siloxane Polymer (B)

The siloxane polymer (A) is obtained by hydrolyzing or condensing the monofunctional silane represented by formula (1) and the trifunctional silane represented by formula (2). In addition, the siloxane polymer (B) is obtained by hydrolyzing or condensing the bifunctional silane represented by formula (3) and the tetrafunctional silane represented by formula (4). Reaction methods of the siloxane polymer (A) and the siloxane polymer (B) are not limited; that is, the siloxane polymer (A) and the siloxane polymer (B) can be fabricated by hydrolyzing or condensing the silane aforementioned. The hydrolysis reaction can use water and acidic or basic catalysts. Acid catalysts include: formic acid, acetic acid, trifluoroacetic acid, nitric acid, sulfuric acid, hydrochloric acid, fluoric acid, boronic acid, phosphoric acid, cation exchange resin and so on. Basic catalysts include: ammonia, triethylamine, monoethanolamine, diethanolamine, triethanolamine, sodium hydroxide, sodium carbonate, sodium hydrogen carbonate, potassium hydroxide, anion exchange resin and so on. The reaction does not require a specific temperature and is usually performed under 50° C. to 150° C. The reaction does not require a specific time and is usually performed for 1 hour (hr) to 48 hr. Moreover, the reaction can be performed under compression, decompression or any atmospheric pressure. After the reaction is carried out, components with low molecular weight are preferably removed through an evaporation process for stabilizing the siloxane polymer. The evaporation removal is performed under decompression or normal pressure. When the evaporation removal is carried out under normal pressure, an evaporation removal temperature usually ranges from 100° C. to 200° C.

A solvent used in the above reaction is preferably a solvent used for dissolving the silane aforementioned and the siloxane polymer (A) and the siloxane polymer (B) synthesized. The solvent is a type of solvent or a mixture of two or more types of solvents. Examples of the solvent includes: methanol, ethanol, 1-propanol, 2-propanol, 1-butanol, 2-butanol, isobutanol, tert-butanol, acetone, 2-butanone, acetic ether, propyl acetate, tetrahydrofuran, acetonitrile, dioxane, toluene, xylene, cyclohexanone, ethylene glycol monoethyl ether, propylene glycol monomethyl ether, propylene glycol monomethyl ether acetate, diethylene glycol dimethyl ether, diethylene glycol methyl ethyl ether, methyl 3-methoxypropionate, ethyl 3-ethoxypropionate, and so on.

When a weight average molecular weight of the siloxane polymer (A) and the siloxane polymer (B) obtained from a standard gel permeation chromatography (GPC) analysis ranges from 1000 to 100,000, the cured film formed from the thermosetting composition obtained is preferable in enhancing heat resistance and solvent resistance. When the weight average molecular weight ranges from 1500 to 50,000, the compatibility of the siloxane polymer (A) and the siloxane polymer (B) with other components is increased, and the cured film formed from the thermosetting composition obtained is preferable in inhibiting bleaching and surface roughening of the film. Based on the same reasons, when the weight average molecular weight ranges from 2,000 to 20,000, the cured film formed from the thermosetting composition obtained is most preferable in inhibiting bleaching and surface roughening of the film.

Further, in the invention, polystyrene with a weight average molecular weight ranging from 645 to 132,900 (i.e. the polystyrene calibration kit PL2010-0102 manufactured by VARIAN Inc.) can be used as a standard polystyrene, the PLgel MIXED-D (manufacture by VARIAN Inc.) is used as a column, tetrahydrofuran (THF) is adopted as a mobile phase, and GPC is used for measurement for the weight average molecular weight.

1-9 Solvent

A solvent used in the invention is a mixed solvent containing more than 20 wt % of solvents with boiling points ranging from 100° C. to 300° C. Other than the solvents with boiling points ranging from 100° C. to 300° C., one or more than two conventional solvents can be adopted in the mixed solvent. Relative to the total content of the thermosetting composition, a content of the solvent is preferably 20 wt % to 80 wt %, more preferably 20 wt % to 70 wt %, and most preferably 20 wt % to 50 wt %.

The solvents used in the invention are preferably selected from at least one of propylene glycol monoethyl ether, propylene glycol monomethyl ether acetate, propylene glycol monoethyl ether acetate, methyl 3-methoxypropionate, ethyl 3-ethoxypropionate, diethylene glycol monoethyl ether acetate, diethylene glycol monobutyl ether acetate, diethylene glycol dimethyl ether, diethylene glycol methyl ether, ethyl lactate, and butyl acetate to enhance coating uniformity.

1-10 Other Components

The thermosetting composition of the invention include components other than the siloxane polymer (A), the siloxane polymer (B), and the solvent. Other components include, for example: siloxane compound other than the siloxane polymer (A) and the siloxane polymer (B) (other siloxane compounds), surfactant, epoxy resin, epoxy hardener, thermocrosslinking agents such as melamine compound or diazide compound, anti-oxidant, polymer dispersing agents such as acrylic, styrene, polyethylenimine, or urethane, sealability enhancer such as silicon coatability enhancer, silane coupling agent, and ultraviolet (UV) absorbent such as alkoxy benzophenone. One or more than two of the above components can be added to the thermosetting composition. In addition, each of the components aforementioned can be one or more than two types.

1-10-1 Other Siloxane Compounds

In order to enhance various performances, the thermosetting composition of the invention can further includes other siloxane compounds. Conventional siloxane compounds can be adopted within the scope of conventional contents for these other siloxane compounds.

1-10-2 Surfactant

The thermosetting composition of the invention further includes a surfactant to enhance coating uniformity. Accordingly, relative to the total content of the thermosetting composition, a content of the surfactant is preferably 0.01 wt % to 10 wt %, more preferably 0.05 wt % to 8 wt %, and most preferably 0.1 wt % to 5 wt %.

The surfactant includes, for example: Polyflow No. 45,Polyflow KL-245, Polyflow No. 75, Polyflow No. 90, Polyflow No. 95 (commercial products manufactured by KYOEISHA CHEMICAL Co., Ltd.), Disperbyk 161, Disperbyk 162, Disperbyk 163, Disperbyk 164, Disperbyk 166, Disperbyk 170, Disperbyk 180, Disperbyk 181, Disperbyk 182, BYK300, BYK306, BYK310, BYK320, BYK330, BYK344, BYK346 (commercial products manufactured by BYK-Chemie Japan), KP-341, KP-358, KP-368, KF-96-50CS, KF-50-100CS (commercial products manufactured by Shin-Etsu Chemical Co., Ltd.), Surflon SC-101, Surflon KH-40 (commercial product manufactured by Seimi Chemical Co., Ltd.), Ftergent 222F, Ftergent 251, FTX-218 (commercial products manufactured by Neos Co., Ltd.), EFTOP EF-351, EFTOP EF-352, EFTOP EF-601, EFTOP EF-801, EFTOP EF-802, (commercial product manufactured by Mitsubishi Materials Corp.), MEGAFACE F-171, MEGAFACE F-177, MEGAFACE F-475, MEGAFACE R-08, MEGAFACE R-30 (commercial product manufactured by DIC Inc.), fluoroalkyl benzene sulfonate, fluoroalkyl carboxylate, fluoroalkyl polyoxyethylene ether, fluoroalkyl ammonium iodide, fluorooctane surfapropyl betaine, fluoroalkylsulfonate, diglycerol tetrakis(fluoroalkyl polyoxyethylene ether), fluoroalkyltrimethyl ammonium salt, fluoroalkyl aminosulfonate, polyoxyethylene nonylphenyl ether, polyoxyethylene nonylphenyl ether octyl ether, polyoxyethylene alkyl ether, polyoxyethylene lauryl ether, polyoxyethylene oleyl ether, polyoxyethylene tridecyl ether, polyoxyethylene cetyl ether, polyoxyethylene stearyl ether, polyoxyethylene laurate, polyoxyethylene oleate, polyoxyethylene stearate, polyoxyethylene lauryl amine, sorbitan laurate, sorbitan palmitate, sorbitan stearate, sorbitan oleate, sorbitan fatty acid ester, polyoxyethylene sorbitan laurate, polyoxyethylene sorbitan palmitate, polyoxyethylene sorbitan stearate, polyoxyethylene sorbitan oleate, polyoxyethylene naphthylether, alkylbenzene sulfonate, or alkyl diphenyl ether disulfonate.

Among these, commercial surfactants and fluoric surfactants including fluoroalkyl benzene sulfonate, fluoroalkyl carboxylate, fluoroalkyl polyoxyethylene ether, fluoroalkyl ammonium iodide, fluoroalkyl betaine, fluoroalkylsulfonate, diglycerol tetrakis(fluoroalkyl polyoxyethylene ether), fluoroalkyltrimethyl ammonium salt, fluoroalkyl aminosulfonate, are preferable for enhancing coating uniformity of the thermosetting composition.

1-10-3 Epoxy Resin

The thermosetting composition of the invention further includes epoxy resins for enhancing heat resistance, chemical resistance, surface uniformity, flexibility, pliability, and elasticity.

The epoxy resins are preferably multifunctional epoxy resins for obtaining a cured film with high chemical resistance. The multifunctional epoxy resins include, for example: bisphenol A type epoxy resins, glycidyl ether type epoxy resins, and aliphatic epoxy resins. Examples of the epoxy resins include, for instance: Epikote 807, Epikote 815, Epikote 825, Epikote 827, Epikote 828, Epikote 190P, and Epikote 191P (commercial products manufactured by Yuka Shell Epoxy Co., Ltd.), Epikote 1004, Epikote 1256, YX8000 (commercial products manufactured by Japan Epoxy Co., Ltd.), Araldite CY177, Araldite CY184 (commercial products manufactured by Nihon Ciba-Geigy Co., Ltd.), CLLOXIDE 2021P, EHPE-3150 (commercial products manufactured by DAICEL CHEMICAL INDUSTRIES, Ltd.), and TECHMORE VG3101L (commercial products manufactured by Mitsui & Co., Ltd.).

Moreover, epoxy resins can also be added to the thermosetting composition aforementioned to enhance flexibility, pliability, and elasticity. Accordingly, a content of the epoxy resins is preferably under 30 wt % relative to the total content of the thermosetting composition.

The epoxy resins added for the above purpose include, for example: Epikote 871, Epikote 872, Epikote 4250, Epikote 4275 (commercial products manufactured by Japan Epoxy Resin Co., Ltd.), EPICLON TSR-960, EPICLON TSR-601, EPICLON TSR-250-80BX, EPICLON 1600-75X (commercial products manufactured by DIC Inc.), YD-171, YD-172, YD-175X75, PG-207, ZX-1627, YD-716 (commercial products manufactured by Nippon Steel Chemical Co., Ltd.), ADEKA RESIN EP-4000, ADEKA RESIN EP-4000S, ADEKA RESIN EPB 1200 (commercial products manufactured by ADEKA Corp.), EX-832, EX-841, EX-931, DENAREX R-45EPT (commercial products manufactured by Nagase ChemteX Corp.), BPO-20E, BPO-60E (commercial products manufactured by New Japan Chemical Co.), Epolight 400E, Epolight 400P, Epolight 3002 (commercial products manufactured by KYOEISHA CHEMICAL Co., Ltd.), SR-8EG, SR-4PG (commercial products manufactured by Sakamoto Pharmaceutical Co.), Heloxy 84, Heloxy 505 (commercial products manufactured by Hexion Specialty Chemicals, Inc.), SB-20G, IPU-22G (commercial products manufactured by Okamura Oil Mill, Ltd.), Epolead PB3600 (commercial products manufactured by DAICEL CHEMICAL INDUSTRIES, Ltd.), and EPB-13 (commercial products manufactured by Nippon Soda Co., Ltd.).

1-10-4 Epoxy Hardener

When containing other epoxy resins, the thermosetting composition of the invention preferably contains an epoxy hardener to enhance heat resistance, chemical resistance, flexibility, and pliability of the cured film. The epoxy hardener includes, for example: carboxylic acid hardener, anhydride hardener, amine hardener, phenol hardener, and catalyst hardener. To inhibit coloring and enhance heat resistance, the epoxy hardener is preferably carboxylic acid hardener, anhydride hardener, or phenol hardener.

Examples of carboxylic acid hardener as the epoxy hardener include: SMA17352 (commercial product, manufactured by SARTOMER Company Inc.). Examples of anhydride hardener as the epoxy hardener include: SMA1000, SMA2000, SMA3000 (commercial product, manufactured by SARTOMER Company Inc.), maleic anhydride, tetrahydrophthalic anhydride, hexahydrophthalic acid, methyltetrahydrophthalic anhydride, methylhexahydrophthalic anhydride, phthalic anhydride, tetrahydrophthalic anhydride, methyl tetrahydrophthalic anhydride, trimellitic annydride, hexahydrotrimellitic annydride, methylnadic anhydride, hydro methylnadic anhydride, dodecenyl succinic anhydride, pyromellitic dianhydride, hexahydropyromellitic dianhydride, benzophenonetetracarboxylic dianhydride, TMEG, TMTA-C, TMEG-500, TMEG-600 (commercial products, manufactured by New Japan Chemical Co.), EpiclonB-4400 (commercial products manufactured by DIC Inc.), YH-306, YH-307, YH-309 (commercial products manufactured by Japan Epoxy Resin Co., Ltd.), SL-12AH, SL-20AH, IPU-22AH (commercial products manufactured by Okamura Oil Mill, Ltd.), and OSA-DA, DSA, PDSA-DA (commercial products manufactured by Sanyo Chemical Industries Inc.).

Preferred examples of phenol hardener include: hydroquinone, catechol, resorcinol, phloroglucinol, pyrogallol, 1,6-dihydroxy naphthalene, 2,7-dihydroxy naphthalene, 2,6-dihydroxy naphthalene, 1,2,4-trihydroxybenzene, 1,3-dihydroxy naphthalene, 1,4-dihydroxy naphthalene, 1,5-dihydroxy naphthalene, 1,7-dihydroxy naphthalene, 2,3-dihydroxy naphthalene, 1,2-dihydroxy naphthalene, 2-methylresorcinol, 5-methylresorcinol, hexahydroxybenzene, 1,8,9-trihydroxyanthracene, 3-methyl-pyrocatecho, methyl-hydroquinon, 4-methyl-pyrocatecho, 4-benzylresorcinol, 1,1'-bis(2-naphthol), 4,4'-bisphenol, bis(4-hydroxyphenyl)sulfone, and 4-bromoresorcinol.

Moreover, preferred examples of phenol hardener include: 4,4'-butylidenebis(6-tert-butyl-3-m-cresol), 4-tert-butylcatechol, 2,2'-bisphenol, 4,4'-dihydroxydiphenylmethane, tert-butylhydroquinone, 1,3-bis(4-hydroxyphenoxy)benzene, 1,4-bis(3-hydroxyphenoxy)benzene, 1,1-bis(4-hydroxylphenyl)cyclohexane, bis(4-hydroxyl-3,5-dimethylphenyl)sulfone, 9,9-bis(4-hydroxyphenyl)fluorine), 9,9-bis(4-hydroxyl-3-methylphenyl)fluorine, 4-tert-butyl calix[8]arene, 4-tert-butyl calix[5]arene, 4-tert-butylsulfonyl calix[4]arene, calix[8]arene, calix[4]arene, calix[6]arene, and 4-tety-butyl calix[6]arene.

In addition, preferred examples of phenol hardener include: 2,5-bis(1,1,3,3,-tetramethylbutyl)hydroquinone, 2,6-bis [(2-hydroxy-5-methylphenol)methyl]-4-methylphenol, 1,1-bis(3-cyclohexyl-4-hydroxylphenol)cyclohexane, 1,1-bis(4-hydroxyl-3-methylphenol)cyclohexane, hexestrol, 2',4'-dihydroxyacetophenone, anthrarufin, chrysazin, 2,4-dihydroxybenzaldehyde, 2,5-dihydroxybenzaldehyde, 3,4-dihydroxybenzaldehyde, ethyl 3,4-dihydroxyaminobenzoate, 2,4-dihydroxybenzophenone, 2,2'-dihydroxy-4,4'-dimethoxy-benzophenone, 4,4'-dihydroxybenzophenone, 4-ethylresorcinol, and phenylhydroquinone.

Furthermore, preferred examples of phenol hardener include: 2,2+-dihydroxy-4-methoxybenzophenone, 2,2'-dihydroxybenzophenone, methyl 2,6-dihydroxyaminobenzoate, 2,3-dihydroxybenzaldehyde, octafluoro-4,4'-bisphenol, 3',6'-dihydroxybenzoylnorbornene, 2,4'-dihydroxydiphenylmethane, 2',5'-dihydroxyacetophenone, 3',5'-dihydroxyacetophenone, 2,4-dihydroxyaminobenzoate, 2-hydroxyethyl-4,4'-dihydroxydiphenyl etherdihydroxydiphenyl ether, 2,2'-dihydroxydiphenyl ether, methyl 3,5-dihydroxyaminobenzoate, 1,4-dihydroxy-2-naphthoate, 3',4'-dihydroxyacetophenone, 2,4'-dihydroxydiphenyl sulfone, 3,4'-dihydroxybenzyl alcohol, and 3,5-dihydroxybenzyl alcohol.

Also, preferred examples of phenol hardener include: 2,4'-dihydroxybenzophenone, 2,6'-dimethyl hydroquinone, daidzein, 2',4'-dihydroxypropiophenone, 4,4'-dihydrxytetraphenylmethane, methyl 3,4-dihydroxyphenylacetate, 2,5-dimethylresorcinol, 2-(3,4-dihydroxyphenyl)ethanol, 4,4'-ethylidene bis-phenol, 3,3'-ethylenedioxydiphenol, 4-fluorocatechol, ethyl gallate, methyl gallate, propyl gallate, isoamyl gallate, hexadecyl gallate, dodecyl gallate, stearyl gallate, butyl gallate, isobutyl gallate, and n-octyl -4-hexylresorcinol gallate.

Preferred examples of phenol hardener include: 4,4'-(2-hydroxybenzilidene)bis(2,3,6-trimethylphenol), 4,4'-methylene-bis-(2,6-di-tert-butylphenol), 2,2'-methylene-bis(6-tert-butyl-4-ethyl phenol), 2,2'-methylene-bis(6-tert-butyl-4-cresol), methoxyhydroquinone, 4,4'-(α-methylbenzal) bisphenol, 4,4'-methylene-bis(2,6-dimethylphenol), 2,2'-methylene-bis(4-methylphenol), 5-methoxyresorcinol, 2,2'-methylene-bis[6-(2-hydroxy-5-methylbenzyl)-p-cresol, 4,4'-methylene-bis(2-methylphenol), methyl 2,4-dihydroxyaminobenzoate, 2,2'-methylene-bis(6-cyclohexyl-p-cresol), methyl 3,4-dihydroxyaminobenzoate, and 2,5-dihydroxyaminobenzoate.

Preferred examples of phenol hardener further include: naringenin, leucoquinizarin, 2,2',4,4'-tetrahydroxybenzophenone, 2,4,4'-trihydroxybenzophenone, 5-methylpyrogallol, 2',4',6'-trihydroxypropiophenone, 2,3,4-trihydroxybenzophenone, 2',3',4'-trihydroxyacetophenone, 1,1,1-tris(4-hydroxyphenol)ethane, 2,3',4,4'-tetrahydroxybenzophenone, 4,4',4''-trihydroxytriphenylmethane, 2,3,4,4'-tetrahydroxybenzophenone, 2,3,4,4'-tetrahydroxydiphenylmethane, 5,5',6,6'-tetrahydroxy-3,3,3',3'-tetramethyl-1,1'-spirobiindane, 2,4,5-trihydroxybenzaldehyde, 6,6',7,7'-tetrahydroxy-4,4,4'4'-tetramethylspirobicromane, and tetrafluoro-hydroquinone.

Preferred examples of phenol hardener further include: 2,3,4-trihydroxybenzaldehyde, 2,2-bis(4-hydroxyphenyl) propane, 2,2-bis(4-hydroxyphenyl)hexafluoropropane, 2,2-bis(2-hydroxy-5-biphenyl)propane, 2,2-bis(3-cyclohexyl-4-hydroxyphenyl)propane, 2,2-bis(3-sec-butyl-4-hydroxyphenyl)propane, 2,2-bis(4-hydroxy-3,5-dimethylphenyl)propane, 2,2-bis(4-hydroxy-3-isopropylphenyl)propane, 2,2-bis(4-hydroxy-3-methylphenyl)propane, 2,2-bis(4-hydroxyphenyl)butane, α,α'-bis(4-hydroxy-3,5-dimethylphenyl)-1,4-diisopropylbenzene, α,α'-bis(4-hydroxyphenyl)-1,4-diisopropylbenzene, α,α,α'-tris(4-hydroxyphenyl)-1-ethyl-4-isopropylbenzene, tetrabromobisphenol A, 1,3-bis[2-(4-hydroxyphenyl)-2-propyl]benzene, and α,α-bis(4-hydroxyphenyl)-4-(4-hydroxy-α,α-dimethylbenzyl)ethylbenzene.

Additionally, preferred examples of phenol hardener include: MARUKA KYNCUR M (commercial product, manufactured by Marusen Petrochemical), Milex XLC (commercial product, manufactured by Mitsui & Co. Inc.), MEH-7800, MEP-6309, MEH-7500, MEH-8000H, MEH-8005 (commercial product, manufactured by Meiwa Plastic Industries Ltd.), HE-100C (commercial product, manufactured by Air Water Inc.), YLH-129B65, 170, 171N, YL-6065 (commercial product, manufactured by Japan Epoxy Resin Co., Ltd.), Phenolite VH series, Phenolite KH series, BESMOLCZ-256-A (commercial products, manufactured by DIC Inc.), and DPP-6000 series (commercial product, manufactured by New Japan Chemical Co.).

To enhance heat resistance and solvent resistance of the thermosetting composition, a content of the epoxy hardener is preferably more than 5 wt % relative to the total content of the thermosetting composition. Further, to balance with other characteristics, the content of the epoxy hardener ranges more preferably from 5 wt % to 50 wt %.

1-10-5 Thermo-Crosslinking Agents

The thermosetting composition can further contain thermo-crosslinking agents such as melamine compound or diazide compound to enhance heat resistance and chemical resistance. Accordingly, relative to the total content of the thermosetting composition, a content of the thermo-crosslinking agent is preferably 0.01 wt % to 30 wt %, more preferably 0.05 wt % to 20 wt %, and most preferably 1 wt % to 10 wt %.

The thermo-crosslinking agent includes, for example: NIKALAC MW-30HM, NIKALAC MW-100LM, NIKALAC MW-270, NIKALAC MW-280, NIKALAC MW-290, NIKALAC MW-390, and NIKALAC MW-750LM (commercial products, manufactured by Sanwa Chemical Co., Ltd.). Among these, NIKALAC MW-30HM is preferable based on heat resistance and compatibility.

1-10-6 Anti-Oxidant

The thermosetting composition of the invention can further include an anti-oxidant for weather resistance. Accordingly, relative to the total content of the thermosetting composition, a content of the anti-oxidant is preferably 0.01 wt % to 10 wt %, more preferably 0.05 wt % to 8 wt %, and most preferably 0.1 wt % to 5 wt %. The anti-oxidant includes, for instance: hindered phenol compound, hindered amine compound, phosphorus compound, and sulfur compound. The anti-oxidant is preferably a hindered phenol anti-oxidant.

Examples of the anti-oxidant include, for example: Irganox1010, IrganoxFF, Irganox1035, Irganox1035FF, Irganox1076, Irganox1076FD, Irganox1076DWJ, Irganox1098, Irganox1135, Irganox1330, Irganox1726, Irganox1425 WL, Irganox1520L, Irganox245, Irganox245FF, Irganox245DWJ, Irganox259, Irganox3114, Irganox565, Irganox565DD, Irganox295 (commercial products, manufactured by Ciba Japan KK), and ADK STAB AO-20, ADK STAB AO-30, ADK STAB AO-50, ADK STAB AO-60, ADK STAB AO-70, ADK STAB AO-80 (commercial products, manufactured by ADEKA Corp.). Here, Irganox1010 is preferable for transparency, heat resistance, and crack resistance.

1-10-7 Polymer Dispersing Agent

The thermosetting composition of the invention further includes a polymer dispersing agent to enhance coating uniformity. Accordingly, relative to the total content of the thermosetting composition, a content of the polymer dispersing agent is preferably 0.01 wt % to 10 wt %, more preferably 0.05 wt % to 8 wt %, and most preferably 0.1 wt % to 5 wt %.

The polymer dispersing agent includes, for instance: SOLSPERSE3000, SOLSPERSE5000, SOLSPERSE12000, SOLSPERSE20000, SOLSPERSE32000 (commercial products, manufactured by Lubrizol Japan Ltd.), and Polyflow No.38, Polyflow No.45, Polyflow No.75, Polyflow No.85, Polyflow No.90, Polyflow S, Polyflow No.95, Polyflow ATF, Polyflow KL-245 (commercial products, manufactured by KYOEISHA CHEMICAL Co., Ltd.).

1-10-8 Silicon Coatability Enhancer

The thermosetting composition of the invention further includes a silicone coatability enhancer to enhance coating uniformity. Accordingly, relative to the total content of the thermosetting composition, a content of the silicone coatability enhancer is preferably 0.01 wt % to 10 wt %, more preferably 0.05 wt % to 8 wt %, and most preferably 0.1 wt % to 5 wt %.

The silicon coatability enhancer includes, for example: BYK300, BYK306, BYK310, BYK320, BYK330, BYK344, BYK346 (commercial products, manufactured by BYK-Chemie Japan KK), and KP-341, KP-358, KP-368, KF-96-50CS, KF-50-100CS (commercial products, manufactured by Shin-Etsu Chemical Co., Ltd.).

Among these, BYK306, BYK344, BYK346, KP-341, KP-358 and KP-368 are preferable for enhancing coating uniformity of the thermosetting composition.

1-10-9 Sealability Enhancer

The thermosetting composition of the invention further contains a sealability enhancer to enhance the sealability between the cured film formed and the substrate. Accordingly, a content of the sealability enhancer is preferably under 10 wt % relative to the total content of the thermosetting composition.

The sealability enhancer includes, for instance: silane, aluminum, or titanate coupling agent. Examples of the sealability enhancer include: silane coupling agents such as 3-glycidoxypropyldimethylethoxysilane, 3-glycidoxypropylmethyldiethoxysilane, and 3-glycidoxypropyltrimethoxysilane, aluminum coupling agents such as acetoalkoxyl aluminum diisopropylate, and titanate coupling agents such as tetra-isopropyl-bis(dioctyl phosphite)titanate.

Among these, 3-glycidoxypropyltrimethoxysilane is preferable for greater enhancement in sealability.

1-10-10 UV Absorbent

The thermosetting composition of the invention further contains a ultraviolet absorbent to enhance deterioration resistance of the cured film. Accordingly, relative to the total content of the thermosetting composition, a content of the UV absorbent is preferably 0.01 wt % to 10 wt %, more preferably 0.05 wt % to 8 wt %, and most preferably 0.1 wt % to 5 wt %.

The UV absorbent includes, for example: TINUVIN P, TINUVIN 120, TINUVIN 144, TINUVIN 213, TINUVIN 234, TINUVIN 326, TINUVIN 571, TINUVIN 765 (trademarks, manufactured by Ciba Japan KK). Among these, TINUVIN P, TINUVIN 120, TINUVIN 326 are preferable based on transparency and compatibility.

1-11 Storage of Thermosetting Composition

When stored in a temperature ranging from −30° C. to 25° C., the thermosetting composition of the invention is preferable since the composition becomes more stabilized with time. When stored in a temperature ranging from −20° C. to 10° C., the thermosetting composition is more preferable as no precipitation is obtained.

1-12 Preparation of Coating Solution

A coating solution is prepared by using a solvent to further dilute the thermosetting composition of the invention based on the thickness of the cured film formed.

2. Cured Film of the Invention

The cured film of the invention is a film obtained by curing a coated film formed with the thermosetting composition of the invention. The coated film is formed by coating the thermosetting composition of the invention on a substrate. Here, the conventional substrate and coating technique normally adopted in display devices can be used.

The cured film of the invention has a thickness larger than 10 μm. Moreover, the cured film has superior high transparency, chemical resistance and heat resistance, and does not generate cracks.

The thickness of the cured film is measured by applying the conventional apparatuses or methods to obtain a value standing for the thickness of the cured film. For example, the thickness of the cured film is an average value of values measured at multiple parts of the same film. In order to acquire sufficient mechanical strength, the thickness of the cured film is preferably larger than 10 more preferably larger than 15 μm, and most preferably larger than 20 μm. When the thickness of the cured film stays within these ranges, the cured film then shows superior effects. In addition, to obtain sufficient transparency and prevent cracks from generating, the thickness of the cured film is preferably lower than 200 μm, more preferably lower than 150 μm, and most preferably lower than 100 μm.

The thickness of the cured film is adjusted through the thickness of the coated film formed using the thermosetting composition. The thickness of the film formed using the thermosetting composition is adjusted through, for example, viscosity or repetitive coating of the thermosetting composition. The viscosity of the thermosetting composition is adjusted through concentrations of solid components (mainly components other than the siloxane polymer (A), the siloxane polymer (B), and the solvent).

Specifically, the cured film of the invention is formed through the following.

The thermosetting composition is coated on a substrate such as glass and the like through conventional methods including spin coating, roll coating, and slit coating. The substrate includes, for example: transparent glass substrates such as borofloat glass, soda-lime glass, and silicon-coated soda-line glass, synthetic resin sheets, films, or substrates such as polycarbonate, polyethersulfone, polyester, acrylic resin, vinyl chloride resin, aromatic polyamide resin, polyamideimide, and polyimide, metal substrates such as aluminum plate, copper plate, nickel plate, stainless steel plate, ceramic plate, and semiconductor substrates having photoelectric conversion elements. These substrates can undergo chemical processes using the silane coupling agent and pretreatment such as plasma processing, ion plating, sputtering, vapor phase deposition, vacuum evaporation as required.

The coated substrate is dried for 1 minute (min) to 5 min under 60° C. to 120° C. in a hot plate or an oven. The dried substrate can also be coated repetitively. The repetitive coating can also be performed after the drying process. After being calcinated for 10 min to 20 min under 200° C. to 400° C., the cured film with high transparency and the required thickness is obtained.

3. Display Device of the Invention

The display device of the invention includes the cured film aforementioned. The display device of the invention only includes the cured film but also has the same components as conventional display devices. The display device includes, for instance: liquid crystal display devices, touch panels, devices with the liquid crystal device and the touch panel formed as an integrative unit, and devices with the display device having an organic compound such as organic light emitting display (OLED) and the touch panel formed as an integrative unit.

The display device of the invention also includes the liquid crystal display device. The liquid crystal display device of the invention has, for example, the following components: a color filter, a second transparent substrate having a pixel electrode disposed opposite to the color filter and a common electrode (i.e. a thin film transistor (TFT) substrate), and liquid crystals sandwiched between the two substrates. In the liquid crystal display device, the cured film is used in a film demanding transparency and heat resistance. The liquid crystal display device is fabricated as follows: the color filter substrate after alignment and the second transparent substrate after alignment are oppositely assembled with a spacer in between; a liquid crystal material is packaged; and a polarization film is adhered. The cured film is, for example, formed on a suitable position in the liquid crystal display device according to its use through any one of the coating steps for forming the coated film with the suitable thickness and calcination steps for calcinating the coated film in the fabrication aforementioned.

In addition, an electrode disposed on the substrate in the liquid crystal display device is formed through sputtering on metals such as chromium stacked on the transparent substrate. More specifically, the electrode is formed through an etching process while adopting a specific photo-resist pattern as a mask.

Accordingly, the thermosetting composition of the invention, for example, can form into a cured film with the following characteristics including high solvent resistance, high water resistance, high acid resistance, high base resistance, high heat resistance, high transparency, and high sealability with the substrate required by the cured film formed from the thermosetting composition.

Moreover, the thermosetting composition of the invention does not generate cracks during thermosetting. Thus, a thick film is formed.

Hence, even having a thickness larger than 10 μm, the cured film formed from the thermosetting composition of the invention can have superior transparency, heat resistance and chemical resistance. Further, the cured film is suitable to be applied in liquid crystal devices, touch panels, devices with the liquid crystal device and the touch panel formed as an integrative unit, and devices with the OLED device and the touch panel formed as an integrative unit. Also, the thermosetting composition is suitable for any one of the coating steps forming the suitable thickness and calcinating step in the fabrication of the color filter and the TFT.

[Embodiment]

In the following, the invention is further illustrated through embodiments; however, the invention is not limited thereto.

[Synthetic Embodiment 1] Synthesis of Siloxane Polymer (A1)

In a four-neck flask with a stirrer placed therein, the following are added with the weights specified below. Here, diethylene glycol methyl ethyl ether is added as a reaction solvent, trimethylethoxysilane is added as the monofunctional silane represented by formula (1), trimethoxymethylsilane and triethoxyphenylsilane are added as the trifunctional silane represented by formula (2), and a mixed solution containing 0.19 gram (g) formic acid, 0.08 g phosphoric acid, 11.62 g water, and 4.57 g ethanol. The reaction is heated for 1 hour (hr) under 80° C. Later, components with low molecular weight are removed through 2.5 hr of evaporation removal. The reaction then undergoes 2 hr of evaporation removal under 130° C. to obtain a 70 wt % solution of a siloxane polymer (A1). The components with low boiling points and thus removed through the evaporation removal has a total weight of 21.07 g.

| | |
|---|---|
| diethylene glycol methyl ethyl ether | 6.86 g |
| trimethylethoxysilane | 1.96 g |
| trimethoxymethylsilane | 3.00 g |
| triethoxyphenylsilane | 10.60 g |

The solution aforementioned is cooled to room temperature (25° C.). A portion of the solution is sampled to determine a weight average molecular weight of the siloxane polymer (A1) through the GPC analysis (polystyrene standard). The resulting weight average molecular weight is 4,300.

[Synthetic Embodiment 2] Synthesis of Siloxane Polymer (A2)

Here, instead of trimethoxymethylsilane, triethoxymethylsilane is used as the trifunctional silane represented by formula (2). Then, the same components as those shown in synthetic embodiment 1 are added with the weights specified below. The reaction is performed under the same condition as in synthetic embodiment 1 to obtain a 70 wt % solution of a siloxane polymer (A2). The siloxane polymer (A2) obtained is analyzed with the GPC analysis and the resulting weight average molecular weight is 4,000.

| | |
|---|---|
| diethylene glycol methyl ethyl ether | 5.44 g |
| trimethylethoxysilane | 1.50 g |
| triethoxymethylsilane | 3.00 g |
| triethoxyphenylsilane | 8.10 g |

[Synthetic Embodiment 3] Synthesis of Siloxane Polymer (A3)

Here, instead of triethoxymethylsilane, trimethoxyphenylsilane is used as the trifunctional silane represented by formula (2). Then, the same components as those shown in synthetic embodiment 1 are added with the weights specified below. The reaction is performed under the same condition as in synthetic embodiment 1 to obtain a 70 wt % solution of a siloxane polymer (A3). The siloxane polymer (A3) obtained is analyzed with the GPC analysis and the resulting weight average molecular weight is 3,700.

| | |
|---|---|
| diethylene glycol methyl ethyl ether | 6.40 g |
| trimethylethoxysilane | 1.96 g |
| triethoxyphenylsilane | 3.00 g |
| trimethoxyphenylsilane | 8.75 g |

[Synthetic Embodiment 4] Synthesis of Siloxane Polymer (B1)

The following are added with the weights specified below. Here, diethylene glycol methyl ethyl ether is added as a polymerization solvent, methylphenyldimethoxysilane is added as the bifunctional silane represented by formula (3), tetraethoxysilane is added as the tetrafunctional silane represented by formula (4). The reaction is carried out under the same condition as in synthetic embodiment 1 to obtain a 70 wt % solution of a siloxane polymer (B1). The siloxane polymer (B1) obtained is analyzed with the GPC analysis and the resulting weight average molecular weight is 2,900.

| | |
|---|---|
| diethylene glycol methyl ethyl ether | 8.53 g |
| methylphenyldimethoxysilane | 12.25 g |
| tetraethoxysilane | 7.00 g |

[Synthetic Embodiment 5] Synthesis of Siloxane Polymer (B2)

Here, instead of tetraethoxysilane, tetramethoxysilane is used as the tetrafunctional silane represented by formula (4). Then, the same components as those shown in synthetic embodiment 4 are added with the weights specified below. The reaction is performed under the same condition as in synthetic embodiment 1 to obtain a 70 wt % solution of a siloxane polymer (B2). The siloxane polymer (B2) obtained is analyzed with the GPC analysis and the resulting weight average molecular weight is 3,100.

| | |
|---|---|
| diethylene glycol methyl ethyl ether | 7.89 g |
| methylphenyldimethoxysilane | 12.00 g |
| tetramethoxysilane | 5.00 g |

[Synthetic Embodiment 6] Synthesis of Siloxane Polymer (B3)

Herein, instead of methylphenyldimethoxysilane, dimethyldiethoxysilane and diphenyldiethoxysilane are used as the bifunctional silane represented by formula (3), and tetraethoxysilane is replaced by tetramethoxysilane as the tetrafunctional silane represented by formula (4). Then, the same components as those shown in synthetic embodiment 4 are added with the weights specified below. The reaction is performed under the same condition as in synthetic embodiment 1 to obtain a 70 wt % solution of a siloxane polymer (B3). The siloxane polymer (B3) obtained is analyzed with the GPC analysis and the resulting weight average molecular weight is 3,400.

| | |
|---|---|
| diethylene glycol methyl ethyl ether | 9.01 g |
| dimethyldiethoxysilane | 5.00 g |
| diphenyldiethoxysilane | 9.19 g |
| tetramethoxysilane | 7.00 g |

[Embodiment 1] Fabrication of Thermosetting Composition

The 70 wt % solution of the siloxane polymer (A1) obtained from synthetic embodiment 1 (referred as siloxane polymer (A1) hereinafter), the 70 wt % solution of the siloxane polymer (B1) obtained from synthetic embodiment 4 (referred as siloxane polymer (B1) hereinafter), MEGAFACE R-08 as the surfactant, and diethylene glycol methyl ethyl ether as the solvent are mixed and dissolved based on the weights specified below. The mixture is then filtered through a 0.5 µm membrane filter to obtain the thermosetting composition. The components of the thermosetting composition obtained is shown in Table 1.

| | |
|---|---|
| siloxane polymer (A1) | 10.00 g |
| siloxane polymer (B1) | 10.00 g |
| diethylene glycol methyl ethyl ether | 4.00 g |
| MEGAFACE R-08 | 0.01 g |

[Embodiments 2-9] Fabrication of Thermosetting Composition

In the following, the components shown in Table 1 are also mixed and dissolved to obtain the thermosetting compositions in embodiments 2-9. Moreover, in Table 1, the numbers in the brackets shown represent parts by weight, A1-A3 are the 70 wt % solutions of the siloxane polymers (A1)-(A3), and B1-B3 are the 70 wt % solutions of the siloxane polymers (B1)-(B3). Here, EDM is the abbreviation for diethylene glycol methyl ethyl ether. R-08 represents MEGAFACE R-08.

TABLE 1

| | Siloxane polymer (A) | Siloxane polymer (B) | Solvent | Surfactant |
|---|---|---|---|---|
| Embodiment 1 | A1 (50) | B1 (50) | EDM (20) | R-08 (0.12) |
| Embodiment 2 | A1 (50) | B2 (50) | EDM (20) | R-08 (0.12) |
| Embodiment 3 | A1 (50) | B3 (50) | EDM (20) | R-08 (0.12) |
| Embodiment 4 | A2 (50) | B1 (50) | EDM (20) | R-08 (0.12) |
| Embodiment 5 | A2 (50) | B2 (50) | EDM (20) | R-08 (0.12) |
| Embodiment 6 | A2 (50) | B3 (50) | EDM (20) | R-08 (0.12) |
| Embodiment 7 | A3 (50) | B1 (50) | EDM (20) | R-08 (0.12) |
| Embodiment 8 | A3 (50) | B2 (50) | EDM (20) | R-08 (0.12) |
| Embodiment 9 | A3 (50) | B3 (50) | EDM (20) | R-08 (0.12) |

[Comparative Synthetic Embodiment 1] Synthesis of Comparative Siloxane Polymer (E1)

Herein, trimethylethoxysilane is added as the monofunctional silane represented by formula (1), trimethoxymethylsilane and triethoxyphenylsilane are added as the trifunctional silane represented by formula (2), methylphenyldimethoxysilane is added as the bifunctional silane represented by formula (3), and tetraethoxysilane is added as the tetrafunctional silane represented by formula (4).

The above components are added with the weights specified below. The reaction is carried out under the same condition as in synthetic embodiment 1 to obtain a 70 wt % solution of the comparative siloxane polymer (E1). The siloxane polymer (E1) obtained is analyzed with the GPC analysis and the resulting weight average molecular weight is 9,800.

| | |
|---|---|
| diethylene glycol methyl ethyl ether | 6.41 g |
| trimethylethoxysilane | 0.98 g |
| trimethoxymethylsilane | 1.50 g |
| triethoxyphenylsilane | 5.30 g |
| methylphenyldimethoxysilane | 4.08 g |
| tetraethoxysilane | 3.50 g |

[Comparative Synthetic Embodiment 2] Synthesis of Comparative Siloxane Polymer (E2)

In the following, trimethylethoxysilane is added as the monofunctional silane represented by formula (1), and tetraethoxysilane is added as the tetrafunctional silane represented by formula (4). The above components are added with the weights specified below. The reaction is carried out under the same condition as in synthetic embodiment 1.

| | |
|---|---|
| diethylene glycol methyl ethyl ether | 4.73 g |
| trimethylethoxysilane | 1.80 g |
| tetraethoxysilane | 12.80 g |

The reaction mixture undergoes gelation in the reaction; thus, the target polymer can not be obtained.

[Comparative Synthetic Embodiment 3] Synthesis of Comparative Siloxane Polymer (E3)

Here, trimethylethoxysilane is added as the monofunctional silane represented by formula (1), and methylphenyldimethoxysilane is added as the bifunctional silane represented by formula (3). The above components are added with the weights specified below. The reaction is carried out under the same condition as in synthetic embodiment 1 to obtain a 70 wt % solution of the comparative siloxane polymer (E3).

| | |
|---|---|
| diethylene glycol methyl ethyl ether | 5.92 g |
| trimethylethoxysilane | 1.80 g |
| methylphenyldimethoxysilane | 11.00 g |

The GPC analysis is performed to the siloxane polymer (E3) obtained; however, peak values are not detected.

[Comparative embodiments 1-3] Fabrication of Thermosetting Composition

The thermosetting compositions of comparative embodiments 1 and 3 are obtained from the comparative siloxane polymer solutions obtained from comparative synthetic embodiments 1 and 3 in the same manner as performed in embodiments 1-9. A mixing ratio (weight ratio) of comparative siloxane polymer solution: EDM: R-08 is 100:20:0.18. Here, EDM is the abbreviation for diethylene glycol methyl ethyl ether. R-08 represents MEGAFACE R-08.

Further, as the comparative siloxane polymer solution can not be obtained from comparative synthetic embodiment 2, the thermosetting composition of comparative embodiment 2 is not fabricated.

Evaluation Method

1) Formation of Transparent Film

The thermosetting composition is spin coated on a glass substrate for 10 second (sec) with a random rotation ranging from 400 rpm to 1,000 rpm. The thermosetting composition is then pre-baked for 5 minute (min) on a 100° C. heating plate to dry. The substrate is then baked for 30 min under 300° C. in an oven to form a transparent film with a thickness of about 20 µm. After the substrate is removed from the oven and cooled to room temperature, the thickness of the transparent film obtain is determined. The thickness of the film is measured with a stylus thickness gauge P-15 manufactured by KLA-Tencor Japan Corp. Here, the thickness of the transparent film is obtained from an average value of three parts that are measured.

2) Coatability

When fabricating the transparent film in 1), the coatability (substrate shrink hole) of the thermosetting composition is observed by eye during the pre-baking process. The coatability is good (G: good) when no substrate shrink holes are observed, and not good (NG: No Good) when substrate shrink holes are observed.

3) Cracks

The transparent film obtained from 1) is observed by eye for the generation of cracks. The transparent film is good (G: good) when cracks are not generated on the film surface, and not good (NG: No Good) when cracks are generated on the film surface.

4) Surface Roughness

The surface roughness (Ra value) of the transparent film obtained from 1) is determined. The transparent film is good (G: good) when the Ra value is smaller than 2 nm, and not good (NG: No Good) when the Ra value is larger than 2 nm. The surface roughness of the transparent film is measured with a stylus thickness gauge P-15 manufactured by KLA-Tencor Japan Corp. Here, the surface roughness of the transparent film is obtained from an average value of three parts that are measured.

5) Transparency

With a glass substrate not having a transparent formed thereon as the reference, the transmittance of the substrate with the transparent film obtained from 1) at 400 nm is measured using TC-1800 manufactured by Tokyo Denshoku Co., Ltd. The transparent film is good (G: good) when the transmittance is higher than 95 T %, and not good (NG: No Good) when the transmittance is lower than 95 T %.

6) Acid Resistance

The substrate having the transparent film obtained from 1) is soaked in a 50° C. solution with a weight ratio of hydrochloric acid/nitrate/water=4/2/4 for 10 min. The variation in the thickness of the transparent film is then measured. The thickness of the film is measured before and after soaking in a manner similar to that performed in 1), and the film thickness is calculated with the following formula.

(thickness after soaking/thickness before soaking)× 100 (%)

The transparent film is good (G: good) when the variation of the film thickness ranges from −5% to 5%, and not good (NG: No Good) when the variation of the film thickness is larger than 5% due to swelling or smaller than −5% due to dissolution.

7) Base Resistance

The substrate having the transparent film obtained from 1) is soaked in a 60° C. solution of 5% sodium hydroxide for 10 min. The variation in the thickness of the transparent film is then measured. The thickness of the film is measured before and after soaking in a manner similar to that performed in 1), and the film thickness is calculated with the following formula.

(thickness after soaking/thickness before soaking)× 100 (%)

The transparent film is good (G: good) when the variation of the film thickness ranges from −5% to 5%, and not good (NG: No Good) when the variation of the film thickness is larger than 5% due to swelling or smaller than −5% due to dissolution.

8) Heat Resistance

The substrate having the transparent film obtained from 1) is heated for 1 hr in a 300° C. oven. Thereafter, the transmittance of the substrate is determined in a manner similar to that performed in 4). The thickness of the film is then similarly measured as in 1) before and after the heating, and calculated with the following formula.

(thickness after heating/thickness before heating)×100 (%)

The transparent film is good (G: good) when the variation of the film thickness is smaller than −5% after heating, and not good (NG: No Good) when the variation of the film thickness is larger than −5% after heating.

The results obtained from the evaluation of the thermosetting compositions in embodiments 1-9 through the evaluation methods aforementioned are shown in Table 2.

TABLE 2

| [Embodiment] | Thickness | Coatability | Crack | Surface roughness | Transparency | Acid resistance | Base resistance | Heat resistance |
|---|---|---|---|---|---|---|---|---|
| 1 | 22.3 | G | G | G | G | G | G | G |
| 2 | 21.7 | G | G | G | G | G | G | G |
| 3 | 22.0 | G | G | G | G | G | G | G |
| 4 | 21.5 | G | G | G | G | G | G | G |
| 5 | 21.4 | G | G | G | G | G | G | G |
| 6 | 20.9 | G | G | G | G | G | G | G |
| 7 | 22.3 | G | G | G | G | G | G | G |
| 8 | 20.5 | G | G | G | G | G | G | G |
| 9 | 21.8 | G | G | G | G | G | G | G |

(film thickness is in units of μm)

The results obtained from the evaluation of the thermosetting compositions in comparative embodiments 1-3 through the evaluation methods aforementioned are shown in Table 3. In addition, since comparative embodiment 2 undergoes gelation in the synthetic process, comparative embodiment 2 can not be evaluated. In comparative example 3, shrink holes are generated after the substrate is spin coated with the method illustrated in 1). The substrate thus can not be coated and evaluated.

TABLE 3

| Comparative Embodiment | Thickness | Coatability | Crack | Surface roughness | Transparency | Acid resistance | Base resistance | Heat resistance |
|---|---|---|---|---|---|---|---|---|
| 1 | 22.0 | NG | G | NG | G | G | G | G |
| 2 | — | — | — | — | — | — | — | — |
| 3 | — | — | — | — | — | — | — | — |

(film thickness is in units of μm)

[Utility in Industry]

The thermosetting composition of the invention is adopted in the fabrications of, for instance, liquid crystal display devices, touch panels, liquid crystal display devices having touch panels, and OLED display devices having touch panels.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A thermosetting composition, comprising a solvent, a siloxane polymer (A) and a siloxane polymer (B), wherein the siloxane polymer (A) is obtained by hydrolyzing or condensing a silane mixture containing a monofunctional silane represented by formula (1) and a trifunctional silane represented by formula (2), and the siloxane polymer (B) is obtained by hydrolyzing or condensing a silane mixture containing a bifunctional silane represented by formula (3) and a tetrafunctional silane represented by formula (4):

-continued

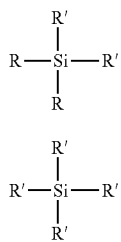

in formulae (1) to (4), R independently represents hydrogen, an alkyl group having 1 to 10 carbons whose arbitrary hydrogen can be replaced by a halogen, an aryl group having 6 to 10 carbons whose arbitrary hydrogen can be replaced by a halogen, or an alkenyl group having 2 to 10 carbons whose arbitrary hydrogen can be replaced by a halogen, and R' independently represents a hydrolyzable group.

2. The thermosetting composition as claimed in claim 1, wherein in the thermosetting composition comprising the siloxane polymer (A), the siloxane polymer (B), and the solvent, in formulae (1) to (4), R independently represents hydrogen, an alkyl group having 1 to 5 carbons whose arbitrary hydrogen can be replaced by a halogen, an aryl group having 6 to 10 carbons whose arbitrary hydrogen can be replaced by a halogen, or an alkenyl group having 2 to 10 carbons whose arbitrary hydrogen can be replaced by a halogen, and R' independently represents an alkoxyl group, a halogen, or an acetoxyl group.

3. The thermosetting composition as claimed in claim 1, wherein the monofunctional silane represented by formula (1) is one or more monofunctional silanes selected from a group consisting of trimethylmethoxysilane and trimethylethoxysilane.

4. The thermosetting composition as claimed in claim 1, wherein the trifunctional silane represented by formula (2) is one or more trifunctional silanes selected from a group consisting of trimethoxymethylsilane, trimethoxyphenylsilane, triethoxymethylsilane, and triethoxyphenylsilane.

5. The thermosetting composition as claimed in claim 1, wherein the bifunctional silane represented by formula (3) is one or more bifunctional silanes selected from a group consisting of dimethyldimethoxysilane, diphenyldimethoxysilane, methylphenyldimethoxysilane, dimethyldiethoxysilane, diphenyldiethoxysilane, and methylphenyldiethoxysilane.

6. The thermosetting composition as claimed in claim 1, wherein the tetrafunctional silane represented by formula (4) is one or more tetrafunctional silanes selected from a group consisting of tetramethoxysilane and tetraethoxysilane.

7. The thermosetting composition as claimed in claim 1, wherein the monofunctional silane represented by formula (1) is trimethylethoxysilane, the trifunctional silane represented by formula (2) is trimethoxymethylsilane or triethoxyphenylsilane, the bifunctional silane represented by formula (3) is dimethyldiethoxysilane or methylphenyldimethoxysilane, the tetrafunctional silane represented by formula (4) is tetraethoxysilane.

8. A cured film, having crack resistance and a thickness of 10 micrometer (μm) to 200 μm, formed by a thermosetting composition as claimed in any one of claims 1 to 7, and obtained by a curing temperature higher than 200° C.

9. A display device, having a cured film as claimed in claim 8.

* * * * *